United States Patent
Kamdar et al.

(10) Patent No.: US 7,890,259 B2
(45) Date of Patent: Feb. 15, 2011

(54) METHOD AND SYSTEM FOR PROVISIONING TURN-BY-TURN NAVIGATION DEMONSTRATIONS

(75) Inventors: Hitan S. Kamdar, Utica, MI (US); Anthony J. Sumcad, Southfield, MI (US); Russell A. Patenaude, Macomb Township, MI (US); Shpetim S. Veliu, Livonia, MI (US)

(73) Assignee: General Motors LLC, Detroit, MI (US)

( * ) Notice: Subject to any disclaimer, the term of this patent is extended or adjusted under 35 U.S.C. 154(b) by 1216 days.

(21) Appl. No.: 11/191,584

(22) Filed: Jul. 28, 2005

(65) Prior Publication Data

US 2007/0027625 A1  Feb. 1, 2007

(51) Int. Cl.
G01C 21/00 (2006.01)
G01C 21/30 (2006.01)

(52) U.S. Cl. ............ 701/213; 701/207; 701/209; 701/211; 340/995.1; 340/995.12; 340/995.19

(58) Field of Classification Search ............ None
See application file for complete search history.

(56) References Cited

U.S. PATENT DOCUMENTS

| | | | |
|---|---|---|---|
| 4,812,843 A | 3/1989 | Champion | |
| 6,266,610 B1 * | 7/2001 | Schultz et al. | 701/201 |
| 6,542,818 B1 | 4/2003 | Oesterling | |
| 6,643,587 B2 | 11/2003 | Brodie | |
| 6,925,378 B2 | 8/2005 | Tzamaloukas | |
| 7,266,450 B2 * | 9/2007 | Glaza | 701/210 |
| 2003/0069690 A1 * | 4/2003 | Correia et al. | 701/211 |
| 2003/0236818 A1 | 12/2003 | Bruner et al. | |
| 2004/0142678 A1 | 7/2004 | Krasner | |
| 2005/0215200 A1 | 9/2005 | Oesterling | |
| 2007/0027625 A1 * | 2/2007 | Kamdar et al. | 701/213 |
| 2007/0225902 A1 * | 9/2007 | Gretton et al. | 701/202 |

OTHER PUBLICATIONS

U.S. Appl. No. 11/194,308, Reeser.
U.S. Appl. No. 11/191,584, Kamdar.
U.S. Appl. No. 11/138,985, Glaza.
U.S. Appl. No. 11/063,481, Glaza.
U.S. Appl. No. 10/983,773, Glaza.
U.S. Appl. No. 11/145,662, Glaza.
U.S. Appl. No. 11/014,498, Fraser.

* cited by examiner

*Primary Examiner*—Khoi Tran
*Assistant Examiner*—Ian Jen

(57) ABSTRACT

A method of demonstrating navigation in a vehicle includes receiving a navigation demonstration mode request and global positioning information at a call center. A destination prompt is transmitted from the call center to the vehicle. A point-of-interest category is received at a call center. A point-of-interest destination is determined based on the point-of-interest category. A route is determined based on the received global positioning information and the point-of-interest destination. The route is transmitted from the call center to the vehicle.

14 Claims, 4 Drawing Sheets

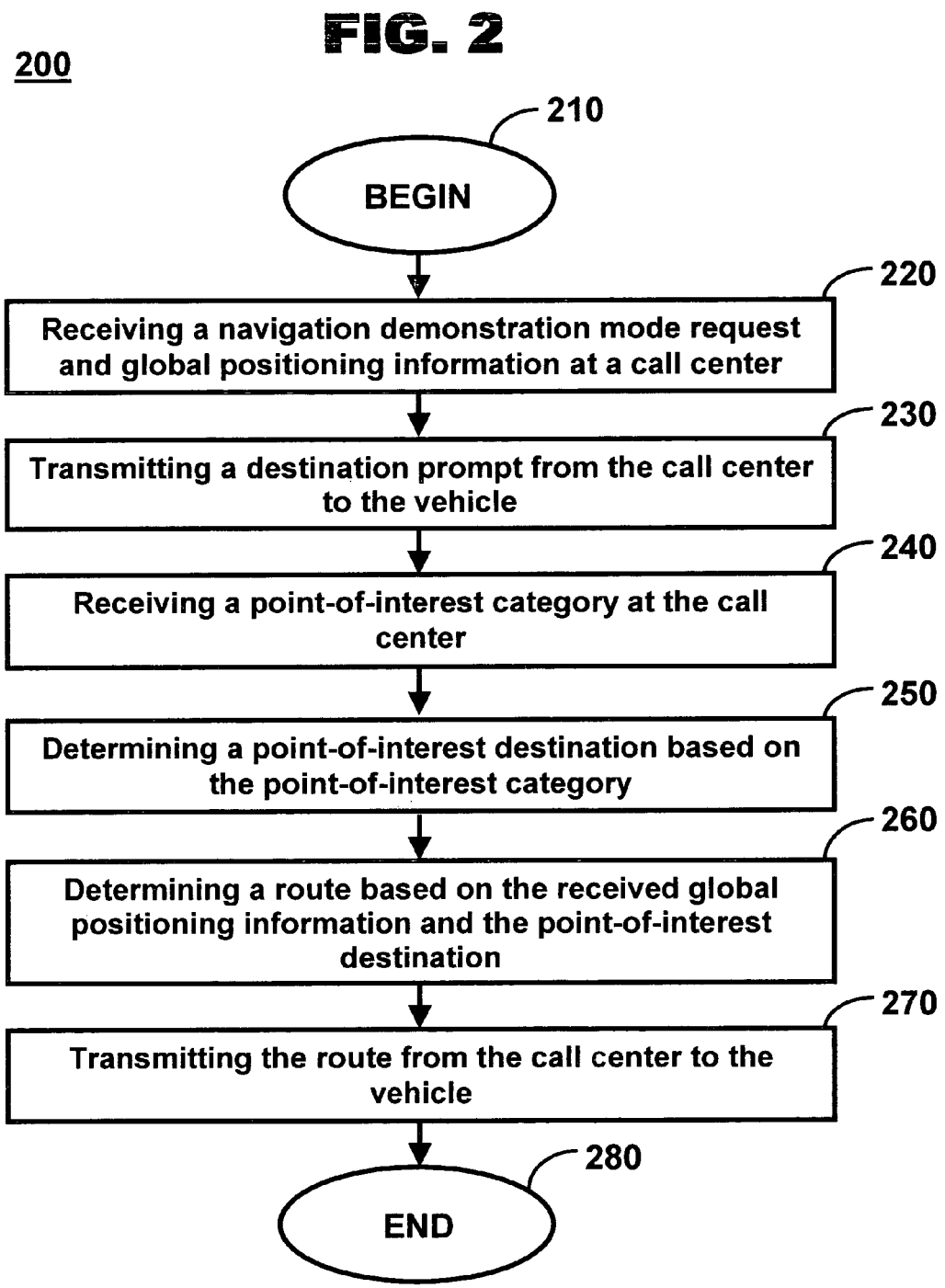

300

- Virtual communication service advisor; "May I suggest a popular category?"
- User: "No."
- Virtual communication service advisor: "May I suggest a category predetermined by the salesperson?"
- User: "Yes."
- Virtual communication service advisor: "Ok. Please select either a local bank or a local gas station."
- User: "Gas station."
- Virtual communication service advisor: "Ok. The gas station category has been selected."

FIG. 3

METHOD AND SYSTEM FOR PROVISIONING TURN-BY-TURN NAVIGATION DEMONSTRATIONS

FIELD OF THE INVENTION

This invention relates generally to data transmissions over a wireless communication system. More specifically, the invention relates to a strategy for provisioning turn-by-turn navigation demonstrations.

BACKGROUND OF THE INVENTION

Many passenger vehicles now incorporate an integrated communication system, such as a Mobile Vehicle Communication Unit (MVCU), providing a variety of fee-based subscription services in a mobile environment including navigational assistance. The MVCU is typically a vehicle telematics device including a cellular radio, satellite transceiver, and/or global positioning capabilities. Typically, a radio communication link is established between the MVCU and a call center through a Wide Area Network (WAN), using a node of the WAN in the vicinity of the MVCU.

Navigational assistance is a very helpful feature often provided by the MVCU. The assistance can determine the current location of the vehicle and provide turn-by-turn navigational instructions to a vehicle user to help reach a destination. Some navigational systems also consider real-time changes in traffic conditions thereby suggesting an alternative faster route, reroute the user should (s)he deviate from the suggested route, and provide other helpful features. Unfortunately, demonstrating the useful features of navigational assistance has remained a challenge. Many users must read lengthy manuals or experience complicated demonstrations in order to comprehend the full potential of navigational assistance. As such, many navigational assistance features may not be used. In addition, the complexity of many navigational systems may prevent potential customers from experiencing many of the benefits of navigational assistance, as they may not be willing to sit through a complex demonstration.

It is an object of this invention, therefore, to provide a strategy for provisioning turn-by-turn navigation demonstrations, and to overcome the deficiencies and obstacles described above.

SUMMARY OF THE INVENTION

One aspect of the invention provides a method of navigating a vehicle. The method includes receiving a navigation demonstration mode request and global positioning information at a call center. A destination prompt is transmitted from the call center to the vehicle. A point-of-interest category is received at a call center. A point-of-interest destination is determined based on the point-of-interest category. A route is determined based on the received global positioning information and the point-of-interest destination. The route is transmitted from the call center to the vehicle.

Another aspect of the invention provides a computer usable medium including a program for demonstrating navigation in a vehicle. The medium includes computer readable program code for receiving a navigation demonstration mode request and global positioning information at a call center, computer readable program code for transmitting a destination prompt from the call center to the vehicle, and computer readable program code for receiving a point-of-interest category at a call center. The medium further includes computer readable program code for determining a point-of-interest destination based on the point-of-interest category, computer readable program code for determining a route based on the received global positioning information and the point-of-interest destination, and computer readable program code for transmitting the route from the call center to the vehicle.

Another aspect of the invention provides a system for demonstrating navigation in a vehicle. The system includes means for receiving a navigation demonstration mode request and global positioning information at a call center, means for transmitting a destination prompt from the call center to the vehicle, and means for receiving a point-of-interest category at a call center. The system further includes means for determining a point-of-interest destination based on the point-of-interest category, means for determining a route based on the received global positioning information and the point-of-interest destination, and means for transmitting the route from the call center to the vehicle.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 illustrates a flowchart of navigating a vehicle, in accordance with one embodiment of the present invention;

FIG. 3 illustrates point-of-interest category suggestions, in accordance with one embodiment of the present invention.

DETAILED DESCRIPTION OF THE PRESENTLY PREFERRED EMBODIMENTS

Figure 1:
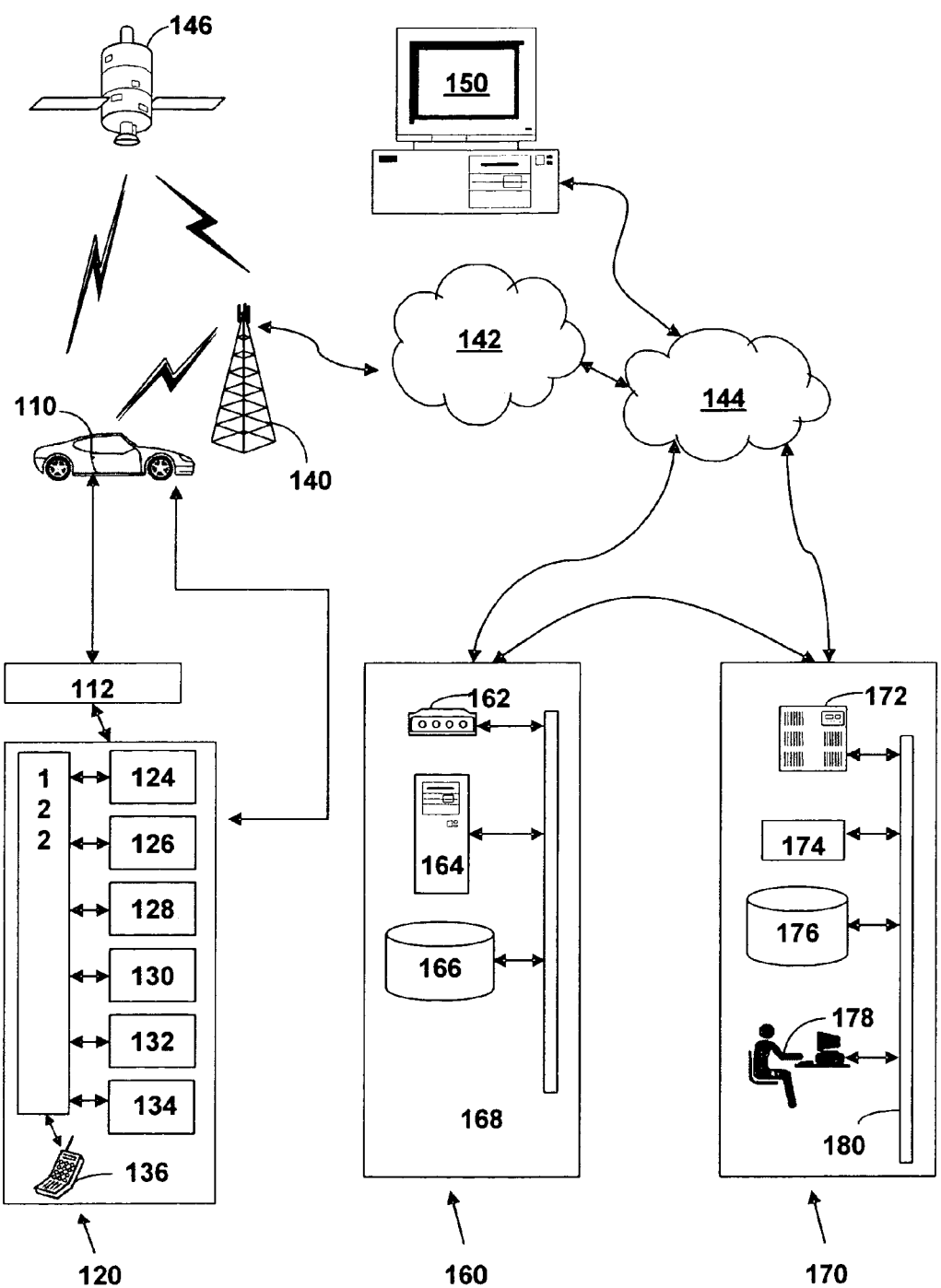
FIG. 1 illustrates a system for navigating a vehicle using a satellite-radio broadcast system, in accordance with one embodiment of the present invention.

FIG. 1 illustrates a system for navigating a vehicle of demonstrating navigation in a vehicle, in accordance with one embodiment of the present invention and shown generally by numeral 100. Particularly, system 100 is used to demonstrate turn-by-turn navigation to a vehicle user. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 is implemented as a motor vehicle, a marine vehicle, or as an aircraft, in various embodiments. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, a navigation demonstration mode request switch 134, and an embedded or in-vehicle mobile phone 136. In other embodiments, telematics unit 120 is implemented without one or more of the above listed components such as, for example, speakers 132. Telematics unit 120 may include additional components not relevant to the present discussion.

In one embodiment, processor 122 is implemented as a microcontroller, controller, host processor, or vehicle communications processor. In one embodiment, processor 122 is a digital signal processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides latitudinal and longitudinal coordinates of the vehicle responsive to a GPS broadcast signal received from one or more GPS satellite broadcast systems (not shown). In-vehicle mobile phone 136 is a cellular-type phone such as, for example a digital, dual-mode (e.g., analog and digital), dual-band, multi-mode or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can interpret human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, digital map information data packets received by the telematics unit 120 from the call center 170 are implemented by processor 122 to determine turn-by-turn directions for a given route.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more land-line telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data is stored at web-hosting portal 160. In another example, a client utilizes computer 150 to predetermine (i.e., input one or more waypoints) and/or configure a demonstration route.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170. The demonstration route(s) is/are stored on the database(s) 166. In addition, one or more point-of-interest destination(s) is/are stored in the databases(s) 166.

Web server 164 receives user-preference data from computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance, and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. In one embodiment, communication services manager 174 includes at least one digital and/or analog modem.

Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, web-hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface interpreting and responding to service requests from telematics unit 120 in MVCU 110. In addition the virtual advisor is capable of interpreting voice commands from a vehicle user.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

FIG. 2 illustrates a flowchart of a method 200 representative of one embodiment of a method of demonstrating navigation in a vehicle. Method 200 begins at 210. The present invention may take the form of a computer usable medium including a program for determining traffic information for a mobile vehicle in accordance with the present invention. The program, stored in the computer usable medium, includes computer program code for executing the method steps described and illustrated in FIG. 2. The program and/or portions thereof are, in various embodiments, stored and executed by the MVCU 110, web-hosting portal 160, call center 170, and associated (sub-) components as needed to navigate the vehicle.

At step 220, a navigation demonstration mode request and global positioning information are received at the call center 170. In one embodiment, the navigation demonstration mode request is received upon operating (e.g., pressing) a switch 134 operably attached to the vehicle. The switch 134 signals to the MVCU 100 that a navigation demonstration mode request is to be transmitted to the call center 170. The global positioning information is sent from the GPS unit 126, which provides the latitudinal and longitudinal coordinates of the vehicle. In the event that a GPS reading is not available from the GPS unit 126 (for example, the vehicle is indoors and cannot locate a GPS satellite), this information is communicated to the call center 170 during an initial data transmission. Based on receiving such a data transmission, the call center can determine a GPS location based on the dealership associated with the vehicle Customer Delivery Record by consulting a database that includes each dealership and the GPS location of the dealership. After determining the GPS location of the dealership, and thus the vehicle, this GPS location is sent to the telematics unit in a subsequent data transmission. In another embodiment, the GPS location is determined by use of GPS signal repeater.

In operation, for example, a potential customer enters a vehicle at a dealership. The salesperson would then operate or instruct the potential customer (i.e., either or both can be the vehicle user) to operate the switch to activate the navigational demonstration. Those skilled in the art will appreciate that the switch may be any type of mechanical and electro/mechanical devices including, but not limited to, a button, a toggle, a remote control device, a key, a voice activated device, and the like.

At step 230, a destination prompt is transmitted from the call center 170 to the vehicle. In one embodiment, the destination prompt includes the virtual communication services advisor 178 querying the user through an option based menu. For example, the user is first queried for a specific point-of-interest destination. If the user provides a specific point-of-interest destination, the demonstration proceeds to step 260. If the user cannot provide a specific point-of-interest destination, they are queried for a point-of-interest category (e.g., a retail store, a gas station, a bank, etc.). If the user provides a point-of-interest category, the demonstration proceeds to step 240. If the user cannot provide a point-of-interest category, they are provided with point-of-interest category suggestions, which are illustrated in FIG. 3, according to one embodiment of the present invention. Suggestions include categories previously chosen by other users (e.g., "popular" categories) and/or categories predetermined by the salesperson or other entity. Upon the user selecting a point-of-interest category suggestion, the demonstration proceeds to step 240.

At step 240, the point-of-interest category is received by the call center 170. In one embodiment, the received point-of-interest category is stored in the database 166 to be used for future point-of-interest category suggestions and/or for other purposes.

At step 250, a point-of-interest destination is determined based on the point-of-interest category. In one embodiment, the point-of-interest destination is selected from a database of one or more possible destinations within a given point-of-interest category. If more than one possible destination exists within a point-of-interest category, the determination is based on one or more factors including, but not limited to, a time factor, a distance factor, a usage history, a navigation factor, and a road condition factor.

For example, if the user selects a retail store as the point-of-interest category and there are five possible retail store destinations within that category, the determination is based on one or more of the factors. The time factor relates to the travel time between the vehicle and the destination. As such, the retail store that is, for example, the shortest travel time away is determined as the point-of-interest destination. The distance factor relates to distance between the vehicle and the destination. As such, the retail store within the closest distance, for example, is selected. The usage history relates to destinations previously selected by navigational demonstration(s). As such, the retail store that has been, for example, most selected in the past would be selected again. The navigation factor relates to destinations that provide various levels of navigational challenge. For example, the retail store that provides the most difficult challenge in terms of navigation is selected. As such, the value of turn-by-turn navigational assistance would be demonstrated. The road condition factor relates to factors that may impede the demonstration such as traffic accidents, lane and road closures, construction, planned or unplanned events impeding the flow of traffic, and the like. As such, a retail store that has, for example, surrounding traffic congestion would be eliminated from being selected as the destination. Those skilled in the art will recognize that numerous factors, alone or in combination, may be utilized to determine the point-of interest destination and are not limited to those described herein.

At step 260, a route based on the received global positioning information and the point-of-interest destination is determined. In one embodiment, the route is determined at the call center 170 between the coordinates provided by the GPS unit 126 and the coordinates of the point-of-interest destination. The route typically includes turn-by-turn directions for navigating the vehicle from the vehicle location to the point-of-interest destination. In addition, the route typically includes return turn-by-turn directions for navigating the vehicle from the point-of-interest destination to the origin of the navigational demonstration (e.g., the vehicle dealership).

Figure 4:
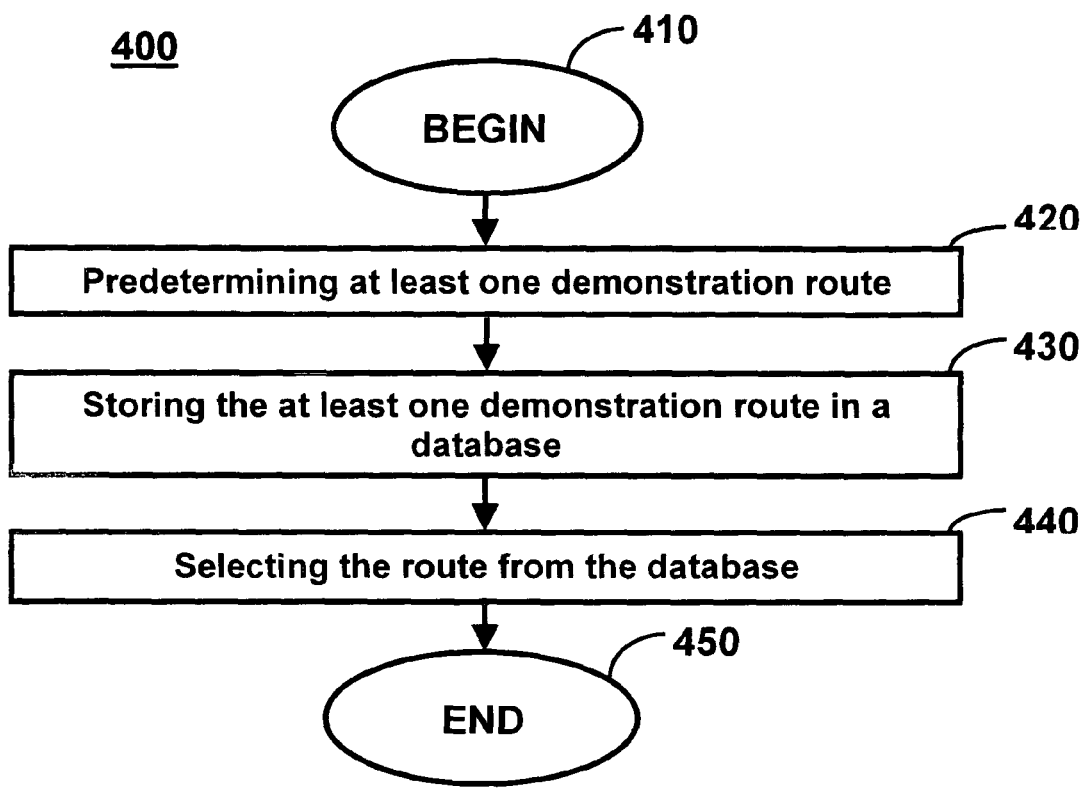
FIG. 4 illustrates a flowchart of determining a route, in accordance with one embodiment of the present invention.

Referring to FIG. 4, in another embodiment, the route is determined according to method 400. Method 400 begins 410 by predetermining a demonstration route at step 420 by, for example, input via the computer 150 or via pre-driving the route (e.g., by the salesperson) while simultaneously transmitting GPS co-ordinates from the vehicle, as known in the art. The demonstration route is then stored in the database 166 at step 430. The route is then selected from the database 166 at step 440 by, for example, providing a prompt to the salesperson while he/she is with the potential customer in the vehicle. Method 400 terminates at step 450.

In another embodiment, the route is determined according to a route strategy. Route strategies include determining routes between a startpoint and an endpoint. The route may vary depending on such factors as reduction of posted speed limits, traffic incidents, accidents, weather conditions, lane and road closures, construction, planned or unplanned events impeding the flow of traffic, and the like. For example, the route may be determined so as to avoid road construction. The route may be determined by examining numerous potential routes with a strategy known in the art. For example, numerous roads are examined with a geographic information system (GIS), which includes built-in precision tools for allowing real-time analysis of traffic flow and vehicle speeds. The GIS can determine the traffic volume of certain roads as well as the average speed of traffic flow on those roads thereby providing determination of an optimal route.

At step 270, the route is transmitted from the call center 170 to the vehicle. In one embodiment, the route including turn-by-turn direction is received by the MVCU thereby allowing the vehicle user to navigate to (and from) the point-of-interest information. As understood in the art, should the vehicle user deviate from the route, additional turn-by-turn directions may be provided to the direct the vehicle back to the original route and/or directly to the point-of-interest destination. The method terminates at step 280 and is repeated at any step as required.

Those skilled in the art will recognize that step(s) may be eliminated, added, or modified in accordance with the present invention. Further, it will be appreciated that the destination prompt, point-of-interest categories, point-of-interest destinations, and point-of-interest destination determination factors may vary from the examples provided herein. The present invention may be embodied in other specific forms without departing from the spirit or essential characteristics. The described embodiments are to be considered in all respects only as illustrative and not restrictive.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of demonstrating navigation in a vehicle, the method comprising:
   receiving a navigation demonstration mode request and global positioning information from a vehicle telematics device at a call center;
   transmitting a destination prompt from the call center to the vehicle telematics device;
   receiving a point-of-interest category at the call center from the vehicle telematics device;
   determining a plurality of candidate point-of-interest destinations based on the point-of-interest category;
   selecting without user intervention one of the plurality of candidate point-of-interest destinations as a demonstration destination based on a route complexity associated with the selected candidate point-of-interest, such that the route complexity associated with the selected candidate point-of-interest is higher than the respective route complexities associated with the remainder of the plurality of candidate point-of-interest destinations; and
   transmitting the route associated with the selected candidate point-of-interest from the call center to the vehicle telematics device.

2. The method of claim 1 wherein the call center operates as a virtual communication services advisor.

3. The method of claim 2 wherein the virtual communication services advisor interprets voice commands.

4. The method of claim 1 wherein transmitting a destination prompt comprises providing a plurality of point-of-interest category suggestions.

5. The method of claim 1 wherein the received point-of-interest category is stored in a database.

6. The method of claim 1 wherein at least one point-of-interest destination is stored in a database.

7. A computer usable medium including a program for demonstrating navigation in a vehicle, the computer usable medium comprising:
   computer readable program code executable by the computer for receiving a navigation demonstration mode request and global positioning information at a call center from a telematics unit of the vehicle;
   computer readable program code executable by the computer for transmitting a destination prompt from the call center to the telematics unit of the vehicle;
   computer readable program code executable by the computer for receiving a point-of-interest category at the call center from the telematics unit of the vehicle;
   computer readable program code executable by the computer for determining a plurality of candidate point-of-interest destination based on the point-of-interest category;
   computer readable program code executable by the computer for selecting without user intervention one of the plurality of candidate point-of-interest destinations as a demonstration destination based on a route complexity associated with the selected candidate point-of-interest, such that the route complexity associated with the selected candidate point-of-interest is higher than the respective route complexities associated with the remainder of the plurality of candidate point-of-interest destinations; and
   computer readable program code executable by the computer for transmitting the route associated with the selected candidate point-of-interest from the call center to the telematics unit of vehicle.

8. The computer usable medium of claim 7, wherein the call center operates as a virtual communication services advisor.

9. The computer usable medium of claim 8, wherein the virtual communication services advisor comprises computer readable program code executable by the computer for interpreting voice commands.

10. The computer usable medium of claim 8, wherein the computer readable program code executable by the computer for transmitting a destination prompt comprises computer readable program code executable by the computer for providing a plurality of point-of-interest category suggestions.

11. The computer usable medium of claim 7, wherein the received point-of-interest category is stored in a database.

12. The computer usable medium of claim 7, wherein at least one point-of-interest destination is stored in a database.

13. A system for demonstrating navigation in a vehicle, the system comprising:
- means for receiving a navigation demonstration mode request and global positioning information at a call center;
- means for transmitting a destination prompt from the call center to the vehicle;
- means for receiving a point-of-interest category at the call center;
- means for determining a plurality of candidate point-of-interest destinations based on the point-of-interest category;
- means for selecting without user intervention one of the plurality of candidate point-of-interest destinations as a demonstration destination based on a route complexity associated with the selected candidate point-of-interest, such that the route complexity associated with the selected candidate point-of-interest is higher than the respective route complexities associated with the remainder of the plurality of candidate point-of-interest destinations;
- and means for transmitting the route associated with the selected candidate point-of-interest from the call center to the vehicle.

14. The system of claim 13 further comprising means for activating the navigation demonstration mode request.

* * * * *